United States Patent [19]
Nishitani et al.

[11] Patent Number: 5,009,694
[45] Date of Patent: Apr. 23, 1991

[54] METHOD FOR HEAT TREATMENT OF GLASS PLATE TO STRENGTHEN ITS PERIPHERAL REGION

[75] Inventors: Masami Nishitani, Mie Pref.; Joji Suetomi, Matsusaka, both of Japan

[73] Assignee: Central Glass Company, Ltd., Ube, Japan

[21] Appl. No.: 527,875

[22] Filed: May 24, 1990

[30] Foreign Application Priority Data

May 31, 1989 [JP] Japan .................. 1-138074

[51] Int. Cl.⁵ ................. C03B 25/00; C03B 27/00
[52] U.S. Cl. ......................... 65/115; 65/104; 65/117
[58] Field of Search ......... 65/103, 104, 106, 107, 65/114, 115, 117–119

[56] References Cited

U.S. PATENT DOCUMENTS

| 3,216,811 | 11/1965 | Golightly | 65/103 |
| 3,372,015 | 3/1968 | Richardson | 65/103 |
| 3,387,963 | 6/1968 | Tilton | 65/104 |
| 4,826,522 | 5/1989 | d'Iribarne et al. | 65/115 |
| 4,871,385 | 10/1989 | Lecourt et al. | 65/115 |
| 4,956,001 | 9/1990 | Kitagawa et al. | 65/104 |

Primary Examiner—Joye L. Woodard
Attorney, Agent, or Firm—Fleit, Jacobson, Cohn, Price, Holman & Stern

[57] ABSTRACT

The invention relates to heat treatment of a glass plate for strengthening only a peripheral region of the glass plate while annealing the major region. The glass plate is heated to a temperature of 550°–650° C. and placed on a ring-like holder which is maintained at a temperature lower than the temperature of the glass plate by 100° to 600° C. such that the peripheral region of the glass plate makes contact with a ring-like upper surface of the holder. Then glass palte on the ring-like holder is kept in an annealing chamber maintained at a temperature in the range from 50° to 500° C. and not higher than the initial temperature of the ring-like holder. After that the glass plate is allowed to cool down to room temperature. This method is applicable to either flat glass plates or curved glass plates and very suitable for treating glass plates ranging from 1.5 to 3.0 mm in thickness.

15 Claims, 3 Drawing Sheets

METHOD FOR HEAT TREATMENT OF GLASS PLATE TO STRENGTHEN ITS PERIPHERAL REGION

BACKGROUND OF THE INVENTION

This invention relates to a method for heat treatment of a glass plate to strengthen a peripheral region of the glass plate by creating plane compressive stresses in a surface of the peripheral region. The heat treatment method is applicable to either a flat glass plate or a curved glass plate.

Glass plates cut into various shapes are widely used in buildings and vehicles, and the use of relatively thin glass plates is increasing. After cutting into desired outline shapes the glass plates are handled for further processing such as laminating or coating, for transportion, for fitting into building or vehicle windows, and so on, and at every stage great care must be taken not to break the glass plates particularly in their edge regions. Therefore, aside from tempered glass plates, there are many proposals of heat treatments for strengthening glass plates only in a peripheral region of each glass plate.

For example, JP No. 32-2684 relates to a sag bending method in which a heated glass plate is supported by a ring-like mold, and proposes to create compressive stresses in a peripheral region of the bent glass plate during annealing of the glass plate on the ring-like mold by making the ring-like mold such that the peripheral region of the glass plate is outside the outer peripheral edge of the ring-like mold and rapidly cooling the protruding peripheral region of the glass plate. However, by this method the annealing process becomes very intricate, and the unsupported peripheral region of the glass plate is susceptible to unwanted deformation such as waving or warping.

JP No. 63-17777 relates to a process of producing a curved and laminated glass panel using two glass plates each having a thickness of 1.5-2.5 mm, and proposes to strengthen a peripheral region of each of two curved glass plates to be laminated while the two glass plates are placed one upon the other on a mold and annealed by rapid cooling of peripheral regions of the both glass plates with blasts of cool air. The rapid cooling is made such that in the temperature range of 450°-550° C. the peripheral region of each glass plate is cooled at a rate of 90° to 150° C./min whereby plane compressive stresses ranging from 250 to 500 kg/cm$^2$ are created in one surface of the peripheral region of each glass plate. Also in this method the peripheral region of each glass plate is outside the outer periphery of the mold, and therefore there is a possibility of unwanted warping or waving of the peripheral region, and it is not easy to create compressive stresses only in the peripheral region of each glass plate.

JP No. 63-21541 (Utility Model) relates to a glass plate bending process which uses a ring-like mold and includes a tempering step to temper the entire area of the bent glass plate with jets of cool air, and proposes to cover the upper surface of the ring-like mold with a stainless steel fiber cloth. The covering is provided primariry in order that the bent glass plate may not show a significant trace of its contact with the ring-like mold in its peripheral region. Besides, it is expected that the provision of the covering permeable to gases will prevent stagnation of cooling air in a narrow gap between the mold surface and the peripheral region of the glass plate whereby the peripheral region will efficiently be quench tempered as well as the major region of the glass plate. This proposal does not relate to tempering of only a peripheral region of a glass plate.

SUMMARY OF THE INVENTION

It is an object of the present invention to provide a heat treatment method for efficiently strengthening a peripheral region of either a flat glass plate or a curved glass plate without causing deformation of the treated glass plate in its peripheral region.

The present invention provides a heat treatment method for strengthening a glass plate in a peripheral region thereof, the method comprising the steps of (a) heating the glass plate to a first temperature in the range from 550° to 650° C., (b) placing the heated glass plate on a ring-like holder, which is maintained at a second temperature lower than the first temperature by 100° to 600° C., such that a peripheral region of the glass plate makes contact with an upper surface of the ring-like holder, (c) keeping the ring-like holder together with the glass plate placed thereon in an annealing furnace maintained at a third temperature which is in the range from 50° to 500° C. and is not higher than the second temperature until the temperature of the glass plate lowers nearly to the third temperature, and (d) after step (c) allowing the glass plate to cool down to room temperature.

Herein, the "peripheral region" refers to a ring-like region along and contiguous to the peripheral edge of the glass plate.

According to the invention a peripheral region of a heated glass plate is adequately tempered, while the major region of the glass plate is annealed, by bringing only the peripheral region of the hot glass plate into contact with a ring-like mold maintained at a temperature lower than the temperature of the glass plate. Compared with the conventional tempering method using blasts of cool air, the method of the invention can accomplish more uniform, more stable and relatively mild tempering of the peripheral region of the glass plate. Since the temperature of the ring-like holder is as stated above, the temperature of the peripheral region of the glass plate never becomes higher than the temperature of the major region of the glass plate. Therefore, the tempering of the peripheral region can be accomplished efficiently and smoothly, and plane compressive stresses created in the peripheral region are well balanced against plane tensile stresses created in a region adjacent to the peripheral region, whereas the major region of the glass plate is smoothly annealed with little influence of tempering of the peripheral region.

Since the peripheral region of the glass plate lies on the upper surface of the ring-like holder, the tempering of the peripheral region is not accompanied by unintended deformation such as waving or warping of the glass plate in that region. If desired it is possible to further surely prevent deformation of the glass plate even in the case of an intricately curved glass plate by gently pressing a retainer or several retainers against the upper surface of the peripheral region of the glass plate on the ring-like holder, particularly at peripheral corner regions of the glass plate. Besides, by using such retainer(s) it is possible to apply the method of the invention to a relatively thick glass plate or to a combination of two glass plates laid one upon the other.

In this invention it is suitable to determine the initial temperature of the ring-like holder and the temperature in the annealing furnace such that plane compressive stresses ranging from 50 to 500 kg/cm² are created in the peripheral region of the cooled glass plate in the surface in contact with the ring-like holder. If the plane compressive stresses are below 50 kg/cm² the peripheral region of the glass plate cannot be regarded as sufficiently strengthened. On the other hand it is unnecessary to strengthen the peripheral region to such extent that the plane compressive stresses exceed 500 kg/cm², and such great stressing of the peripheral region may unfavorably influence the major region of the glass plate.

Preparatory heating of the ring-like holder used in this method is made by keeping the ring-like holder in a hot chamber maintained at the aforementioned second temperature or by using an electric heater provided on the ring-like holder. The upper surface of the ring-like holder may be covered with a covering made of an inorganic, heat-resistant fibrous material.

The method of the invention is applicable to glass plates of various thicknesses. Even relatively thin glass plates ranging from about 3.0 mm to about 1.5 mm in thickness can efficiently be strengthened in a peripheral region of each glass plate. Both flat glass plates and curved glass plates can be strengthened by this method. This method is applicable to the manufacture of glass plates for various uses such as building glasses, vehicle window glasses and furniture glasses, and this method is very suitable for application to curved glass plates to be laminated for use as automobile windshields.

DESCRIPTION OF THE PREFERRED EMBODIMENTS

In the method according to the invention the glass plate is initially maintained at a temperature in the range from 550° to 650° C. This range of temperature includes usual glass plate bending temperatures. Accordingly, in the case of strengthening a peripheral region of a curved glass plate the heat treatment according to the invention can be performed immediately after completion of a bending process. The method for bending the glass plate is arbitrary. For example, either a press bending process or a sag bending process may be employed. Preferably the glass plate is initially maintained at a temperature in the range from 590° to 630° C.

Before placing the heated glass plate on a ring-like holder, the ring-like holder must be maintained at a temperature lower than the temperature of the glass plate by 100° to 600° C. If the temperature difference between the glass plate and the ring-like holder is less than 100° C. it is difficult to sufficiently strengthen the peripheral region of the glass plate. If the temperature difference is more than 600° C., plane compressive stresses created in the peripheral region of the glass plate become too high such as, for example, about 600–700 kg/cm². Such high stressing of the peripheral region is not necessary and is undesirable because of imbalance between the plane compressive stresses and plane tensile stresses created in a region adjacent the peripheral region and also because of unfavorable influence on the annealed major region of the glass plate. Furthermore, excessive stressing of the peripheral region is liable to cause warping, cracking or even breaking of the glass plate. It is suitable that the temperature difference between the heated glass plate and the ring-like holder is in the range from 150° to 500° C., and preferably in the range from 200° to 450° C.

After placing the hot glass plate on the ring-like holder, the ring-like holder is introduced into an annealing furnace maintained at a temperature in the range from 50° to 500° C. and not higher than the initial temperature of the ring-like holder. This temperature of the annealing furnace is suitable for annealing of the major region of the glass plate. It is preferable that the temperature in the annealing furnace is not higher than 480° C. Usually it suffices to keep the ring-like holder supporting thereon the glass plate in the annealing furnace for about 3 min or a still shorter period of time. After that the ring-like holder is taken out of the furnace to allow the glass plate on the holder to cool down to room temperature.

Figure 1:
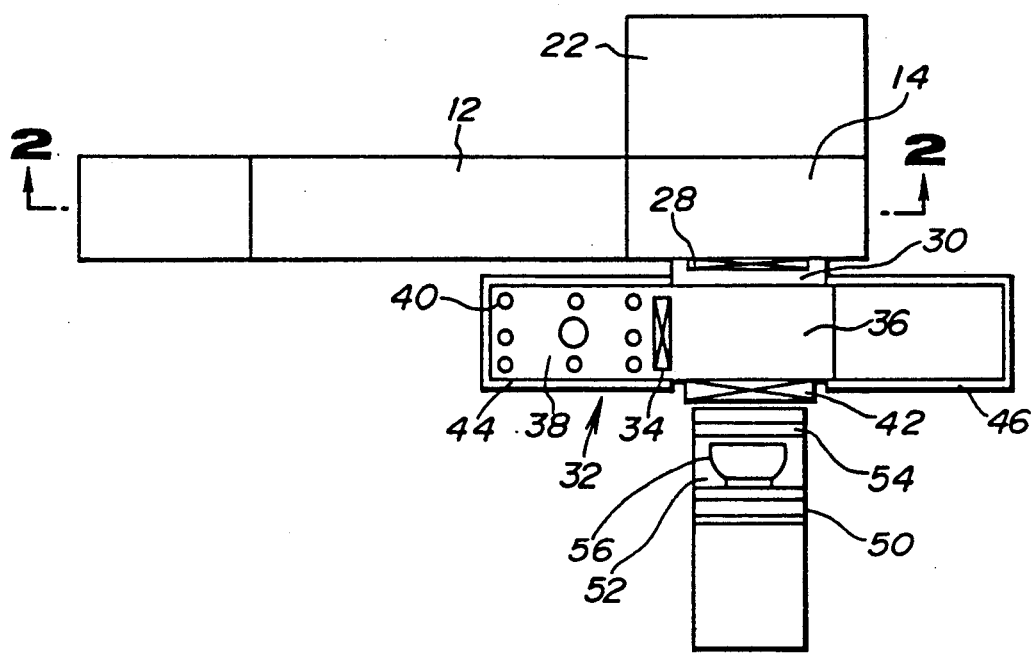
FIG. 1 shows, in a plane view, an outline of an apparatus for bending and annealing glass plates.
Figure 2:
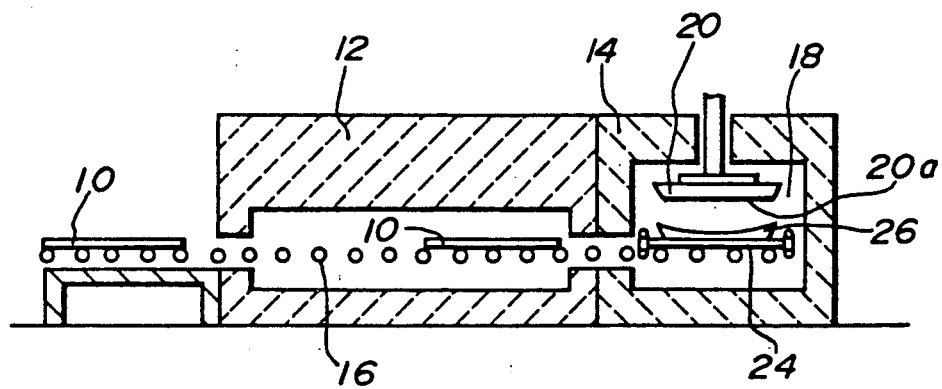
FIG. 2 is a sectional view taken along the line 2—2 in FIG. 1.

FIGS. 1 and 2 show an example of apparatus for heating and bending a glass plate into a predetermined shape and then cooling the still hot, shaped glass plate by a method according to the invention. The apparatus includes a tunnel-type preheating furnace 12 and a shaping furnace 14 adjacent to the exit end of the furnace 12. The two furnaces 12 and 14 are provided with a roller conveyor 16 to transport a series of glass plates 10 to be bent through the length of the preheating furnace 12 and into the shaping furnace 14.

In an upper section of a shaping zone 18 in the furnace 14 there is a vacuum holder 20 which is movable downward and upward, and in a lower section beneath the conveyor rolls 16 the shaping zone 18 is provided with piping (not shown) to spout hot air vertically upward. The bottom surface 20a of the vacuum holder 20 is apertured (not illustrated) for suction, and this surface 20a serves as a shaping surface. There is an auxiliary furnace 22 adjacent to the shaping furnace 14 in the direction at a right angle with the preheating furnace 12. In the auxiliary furnace 22 maintained at a sufficiently high temperature, a dolly 24 mounted with a bending mold 26 stands by. The auxiliary furnace 22 communicates with the shaping zone 18 in the furnace 14, so that the dolly 24 can enter the shaping zone 18 and withdraw therefrom by moving along a path perpendicular to the path of the heated glass plates 10 on the conveyor 16.

On the opposite side of the shaping furnace 14, with respect to the auxiliary furnace 22, there is an annealing furnace 32, and a sealing chamber 30 occupies a narrow space between the shaping furnace 14 and the annealing furnace 32. The sealing chamber 30 is provided with a damper 28 which is hung by wires (not shown) and can be moved upward and downward by actuating a pneumatic or hydraulic cylinder (not shown). The annealing furnace 32 has a horizontally elongate slot-like opening (not shown) in each of the side wall adjacent to the sealing chamber 30 and the opposite side wall and, hence, communicates with the sealing chamber 30. By a damper 42 disposed at right angles with the aforementioned side walls the annealing furnace 32 is partitioned into a high-temperature section 36 and a low-temperature section 38. The damper 42 can be pulled up and lowered by actuating a pneumatic or hydraulic cylinder (not shown) mounted on the ceiling of the furnace 32. The both sections 36 and 38 of the furnace 32 are provided with electric heaters (not shown). The high-temperature section 36 is maintained at a predetermined temperature in the range from 50° to 500° C. and the low-temperature section 38 at another predetermined temperature lower than 300° C. The ceiling of the low-temperature section 38 is studded with vent pipes 40 each provided with a damper.

On a fixed bed (not shown) beneath the annealing furnace 32, a pair of rails (not shown) are laid horizontally to extend parallel to the damper 28 in the sealing chamber 30, and the annealing furnace 32 is slidably mounted on the bed by linear bearings (not shown) engaging the rails. To move the furnace 32 a pneumatic or hydraulic cylinder (not shown) is mounted on the bed, and the piston rod of that cylinder is connected to an end wall of the furnace 32. By actuating the cylinder either of the high-temperature and low-temperature sections 36 and 38 of the annealing furnace 32 can be brought into the position opposite to the sealing chamber 30.

The aforementioned openings in the side walls of the annealing furnace 32 provide access to both the high-temperature section 36 and the low-temperature section 38. When the high-temperature section 36 is opposite to the sealing chamber 30 the opening in the side wall facing the sealing chamber 30 is partly closed by the damper 28, and the opening in the opposite side wall is partly closed by a damper 42 which can be pulled up by operating a pneumatic or hydraulic cylinder (not shown) mounted on an unillustrated frame. To close the remaining portions of the openings a heat insulating cover 44 is fixed to unillustrated pillars. Symmetrically another heat insulating cover 46 is fixedly disposed so as to close the openings in the side walls of the high-temperature section 36 when the low-temperature section 38 is opposite to the sealing chamber 30.

In front of the damper 42, a bed 50 extends horizontally toward the damper 42 at right angles with the side walls of the annealing chamber 32. A glass plate receiving carriage 52 is horizontally movably mounted on the bed 50. For example, a pair of rails (not shown) are laid on the bed 50, and the main part of the carriage 52 is a frame 54 having wheels rolling on the rails. A ring-like holder 56 is horizontally and detachably mounted on the carriage 52. The ring-like holder 56 has a shape conforming to the curved glass plate taken out of the shaping furnace 14. When the damper 42 is pulled up the carriage 52 can be advanced along the rails on the bed 50 to introduce the ring-like holder 56 into the annealing furnace 32. In that case an endmost portion of the frame 54 protrudes into the sealing chamber 30 and is supported by auxiliary rollers (not shown) disposed in the sealing chamber 30. When the damper 28 is pulled up the ring-like holder 56 can be introduced into the shaping zone 18 of the furnace 14 by further advancing the carriage 52. To reversibly drive the carriage 52, for example, a chain driving mechanism (not shown) is used with a reversible motor placed at a location shielded from high temperatures of the furnaces.

Figure 3:
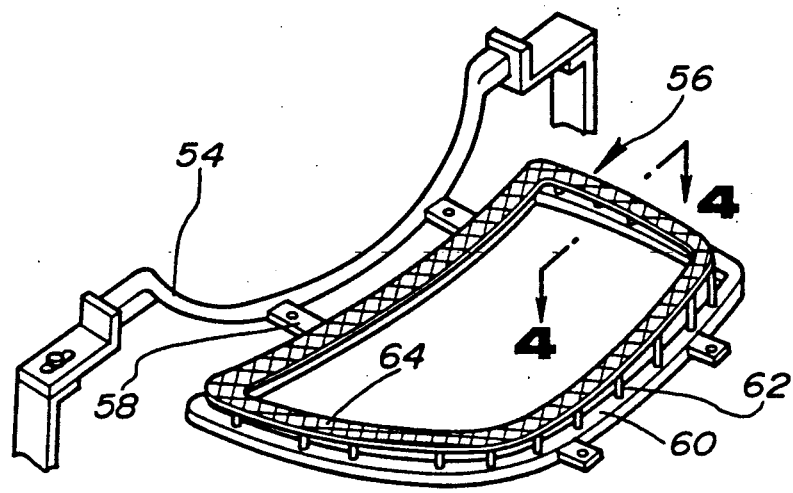
FIG. 3 is a perspective view of a ring-like holder used in this invention.
Figure 5:
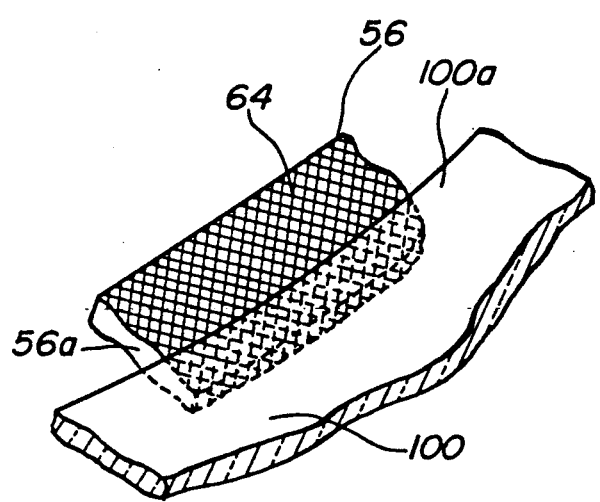
FIG. 5 is a fragmentary and perspective view of a curved glass plate placed on the ring-like holder of FIG. 3.
Figure 4:
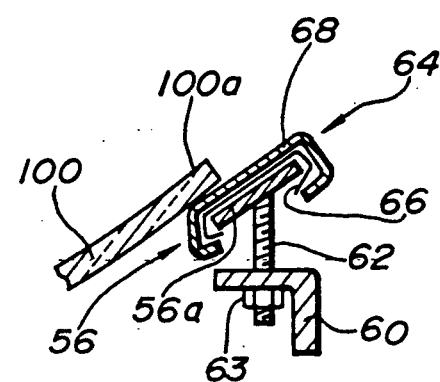
FIG. 4 is an explanatory sectional view taken along the line 4—4 in FIG. 3.

Referring to FIGS. 3 to 5, for mounting the ring-like holder 56 to the carriage 52, a ring-like base 60 is fixed to support bars 58 which protrude horizontally from the frame 54 of the carriage 52. The main body of the ring-like holder 56 is a ring-like frame 56a. A number of bolts 62 project downward from the bottom surface of the ring-like frame 56a to respectively pass through holes bored in the ring-like base 60, and by coupling a nut 63 with each of the bolts 62 the ring-like frame 56a is stationarily held at a desired height above the ring-like base 60. The ring-like frame 56a is almost entirely wrapped in a relatively "soft" covering 64 such that at least the top surface of the frame 56a is covered with the covering 64. In this embodiment the covering 64 is a combination of a stainless steel wire mesh 66 which is in direct contact with the frame 56a and a carbon fiber cloth 68 which is laid on the wire mesh 66 to provide the outermost surface of the ring-like holder 56. These materials of the covering 64 are not limitative. For example, the outermost layer 68 of the covering may alternatively be a glass fiber cloth, a carbon fiber felt or a carbon fiber and metal fiber felt. It is possible to omit the wire mesh 66. It is also possible leave the wire mesh covering 66 exposed by omitting the cloth or felt layer 68.

Figure 6:
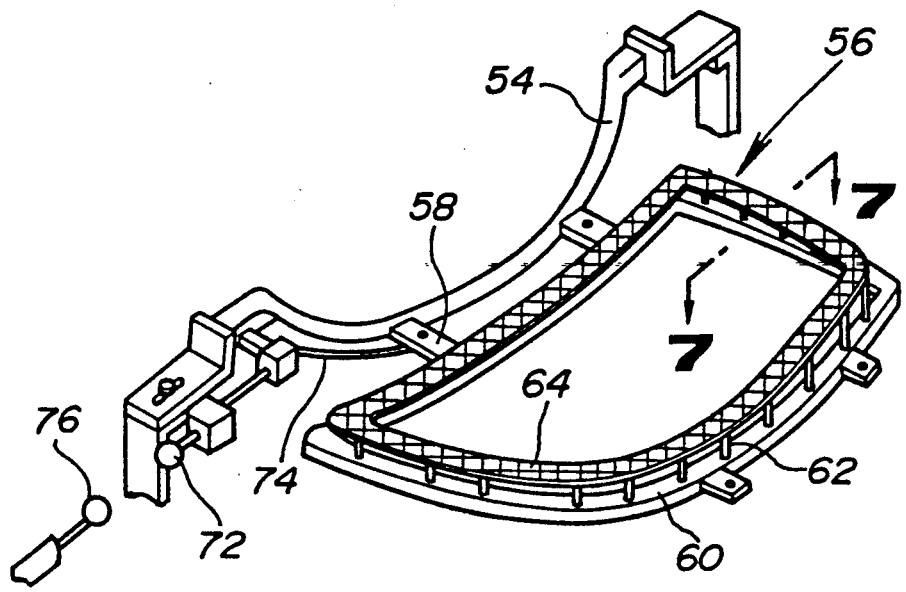
FIG. 6 shows, in a perspective view, the addition of electric heating elements to the ring-like holder of FIG. 3.

As illustrated in FIGS. 5 and 6, the outer perimeter of the ring-like holder 56 is larger than the perimeter of a glass plate 100 to be placed on the holder 56. The breadth of the "ring" of the holder 56 is determined such that when the glass plate 100 is placed on the holder 56 the glass plate makes contact with the holder 56 only in a peripheral region 100a, viz. a ring-like region along and contiguous to the peripheral edge of the glass plate 100. Usually the breadth of the peripheral region 100a of the glass plate 100 is not made larger than about 20 mm, and preferably the breadth is from about 10 mm to about 15 mm.

EXAMPLE 1

To produce a curved glass plate for use as a component of an automobile windshield of lamainated glass, a glass plate having a thickness of about 2 mm was cut into a predetermined shape and bent and partly tempered by using the apparatus shown in FIGS. 1 to 4.

The glass plate 10 was conveyed through the preheating furnace 12 so as to be heated up to about 610° C. Initially the vacuum holder 20 was held in the descended position slightly above the roller conveyor 16. As the heated glass plate 10 was brought into the shaping zone 18 vacuum is applied to the vacuum holder 20, and the glass plate was lifted from the conveyor rolls 16 by the jets of hot air spouted from the piping in the lower section. As the result the glass plate was attracted to the vacuum holder 20. Then the vacuum holder 20 was lifted, and the dolly 24 mounted with the bending mold 26 advanced from the auxiliary furnace 22 into the shaping zone 18. As the dolly 24 stopped in the predetermined position the vacuum holder 20 is lowered to press the glass plate 10 against the bending mold 26. After the bending operation the vacuum holder 20, which was holding the bent glass plate, was lifted to allow the dolly 24 carrying thereon the mold 26 to withdraw from the shaping zone 18 into the auxiliary furnace 22.

Before starting the bending operation the high-temperature section 36 of the annealing furnace 32 was brought into the position opposite to the sealing chamber 30, and the ring-like holder 56 on the carriage 52 was introduced into the high-temperature section 36 of the furnace 32. The temperature in the high-temperature section 36 was maintained at 400° C. so that the temperature of the ring-like holder 56 reached 400° C. Only a stainless steel wire mesh (66) was used as the covering 64 of the ring-like holder 56.

When the bending mold 24 returned into the auxiliary furnace 22 the damper 28 was pulled up, and the carriage 52 was further advanced to introduce the already heated ring-like holder 56 into the shaping zone 18. Then the vacuum holder 20 was relieved of vacuum to allow the curved glass plate to drop onto the ring-like holder 54. Immediately the carriage 52 was retreated to withdraw the ring-like holder 56 and the curved glass plate lying thereon into the high-temperature section 36 of the annealing furnace 32, and the damper 28 was lowered. The temperature in the high-temperature section 36 was still maintained at 400° C. The glass plate on the ring-like holder 56 was allowed to stay in the high-temperature section 36 of the annealing furnace 32 for 1 min. After that the damper 42 was pulled up, and the carriage 52 was retreated to take the ring-like holder 56 together with the glass plate out of the annealing furnace 32. After that the glass plate on the ring-like holder 56 was left to natural cooling until it cooled down to room temperature.

In the peripheral edge (100a) of the thus produced curved glass plate, the values of plane compressive stresses in the surface which was in contact with the ring-like holder 56 were measured at about eighteen (18) points chosen around the perimeter of the glass plate with a precision strain meter (SVP-30-II of Toshiba), and the measurements were averaged to obtain an average value of 167 kg/cm$^2$. Therefore, it was evident that the glass plate was strengthened in the peripheral region.

The strengthened peripheral region 100a of the curved glass plate was free of unintended waving or warping, and the glass surface in contact with the ring-like holder 56 during the heat treatment was smooth and defectless.

EXAMPLES 2-9

In these examples the process of Example 1 was repeated except that the heat treatment conditions and/or the covering 64 of the ring-like holder 56 were selectively changed as shown in Table 1. In Examples 2, 7 and 8, the ring-like holder 56 was left at room temperature (about 25° C.) until receiving thereon the curved and still hot glass plate. As to the covering materials: the "wire mesh" in Table 1 refers to the stainless steel wire mesh used in Example 1; the "metal/carbon felt" used in Examples 6 and 7 was a felt made of stainless steel fibers and carbon fibers and had a thickness of 3.5 mm; the "carbon felt" in Examples 8 and 9 was a felt made of carbon fibers and had a thickness of 3.0 mm.

In every example an average value of plane compressive stresses in the peripheral region of the curved and heat-treated glass plate was determined by the same method as in Example 1. The results are shown in Table 1. In every example the strengthened peripheral region of the glass plate was free of unintended deformation and good in the smoothness of the surface brought into contact with the ring-like holder 56.

COMPARATIVE EXAMPLE 1

As shown in Table 1, the process of Example 1 was modified in that the initial temperature of the curved glass plate was raised to 670° C., that the ring-like holder 56 was kept at room temperature until receiving thereon the curved and still hot glass plate and that the ring-like holder carrying thereon the hot glass plate was immediately taken out of the furnace and left standing at room temperature without using the annealing furnace. As a result, cracks appeared in the peripheral region of the glass plate.

COMPARATIVE EXAMPLE 2

As shown in Table 1, the process of Example 5 was modified mainly by greatly raising the initial temperature of the ring-like holder 56 and the temperature in the annealing furnace. In this case the peripheral region of the glass plate was hardly strengthened.

TABLE 1

|  | Temp. of Heated Glass Plate (°C.) | Ring-like Holder Temp. (°C.) | Ring-like Holder Covering | Annealing Furnace Temp. (°C.) | Annealing Furnace Stay Time (min) | Plane Compressive Stress, average (kg/cm$^2$) |
|---|---|---|---|---|---|---|
| Example 1 | 610 | 400 | wire mesh | 400 | 1 | 167 |
| Example 2 | 620 | R.T. | wire mesh + carbon cloth | 300 | <0.5 | 407 |
| Example 3 | 620 | 300 | " | 300 | 1 | 201 |
| Example 4 | 610 | 350 | " | 350 | 2 | 111 |
| Example 5 | 620 | 350 | wire mesh + glass cloth | 350 | 1 | 180 |
| Example 6 | 610 | 350 | wire mesh + metal/carbon felt | 350 | 1 | 160 |
| Example 7 | 610 | R.T. | " | 350 | <0.5 | 408 |
| Example 8 | 610 | R.T. | wire mesh + carbon felt | 350 | <0.5 | 340 |
| Example 9 | 610 | 200 | " | 200 | 1 | 292 |
| Comp. Ex. 1 | 670 | R.T. | wire mesh | — | — | * |
| Comp. Ex. 2 | 590 | 510 | wire mesh + glass cloth | 510 | 2 | 4 |

R.T.: room temperature.
*Cracks appeared in the tempered glass plate.

As illustrated by the foregoing examples it is possible to maintain the ring-like holder 56 at a desirably elevated temperature by heating the holder 56 in a furnace. However, it is preferable to provide the ring-like holder 56 itself with a heater or heaters. In this regard, FIGS. 6 and 7 show a modification of the ring-like holder 56 of FIGS. 3 and 4.

Figure 7:
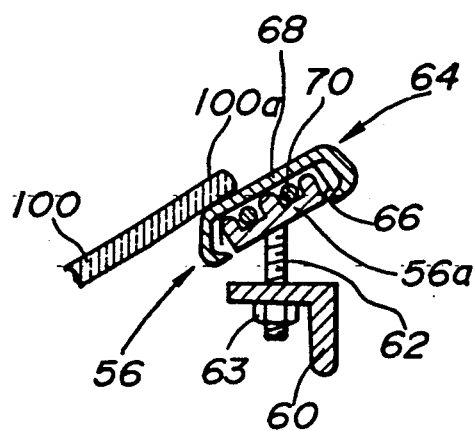
FIG. 7 is a sectional view taken along the line 7—7 in FIG. 6.

As shown in FIG. 7, the ring-like frame 56a of the modified holder 56 is formed with grooves (no reference numeral) along the perimeter of the "ring", and a sheathed electric heater element 70 is fitted into each of these grooves. The heater elements 70 are covered by the covering 64 described with reference to FIGS. 3 to 5. Referring to FIG. 6, an electrical terminal 72 is fixed to the frame 54 of the carriage 52, and a heat resistant cable 74 extends from the terminal 72 to the heater elements 70. To energize the heater elements 70, a power supplying terminal 76 can be brought into contact with the terminal 72 by using a pneumatic cylinder (not shown) or the like. The temperature of the ring-like holder 56 can be controlled by controlling the current supplied to the heater elements 70. The power supplying terminal 76 is disconnected just before introducing the ring-like holder 56 into the shaping furnace 12 to receive the curved glass plate.

After placing a hot glass plate on the ring-like holder heated by its own heater(s), the ring-like holder is introduced into an annealing furnace which is maintained at a temperature not higher than the temperature of the heated ring-like holder and not lower than 50° C. The ring-like holder is kept in the annealing furnace until the temperature of the glass plate lowers to the temperature in the annealing furnace. After that the ring-like holder is taken out of the furnace to allow the glass plate to cool down to room temperature.

EXAMPLES 10–19

Using ring-like holders of the type shown in FIGS. 6 and 7, the process of Example 1 was repeated except that the heat treatment conditions were varied as shown in Table 2. In every example the thickness of the glass plate was about 2 mm. After the heat treatment plane compressive stresses in the peripheral region of the glass plate were measured by the same method as in Example 1.

As shown in Table 2, in every example plane compressive stresses were created in the peripheral region of the glass plate to an adequate degree. That is, the peripheral region of the glass plate was strengthened sufficiently. In every example the strengthened peripheral region of the glass plate was free of unintended waving or warping, and the glass surface brought into contact with the ring-like holder 56 was smooth and defectless.

TABLE 2

|  | Temp. of Heated Glass Plate (°C.) | Ring-like Holder | | Annealing Furnace Temp. (°C.) | Plane Compressive Stress, average (kg/cm$^2$) |
| --- | --- | --- | --- | --- | --- |
|  |  | Temp. (°C.) | Covering |  |  |
| Example 10 | 610 | 350 | wire mesh | 300 | 150 |
| Example 11 | 613 | 350 | " | 200 | 160 |
| Example 12 | 615 | 350 | " | 100 | 165 |
| Example 13 | 610 | 400 | " | 100 | 100 |
| Example 14 | 620 | 200 | " | 200 | 350 |
| Example 15 | 615 | 200 | " | 100 | 370 |
| Example 16 | 610 | 300 | wire mesh + carbon felt | 200 | 220 |
| Example 17 | 620 | 350 | " | 100 | 240 |
| Example 18 | 620 | 400 | wire mesh | 50 | 200 |
| Example 19 | 615 | 400 | " | 200 | 120 |

R.T.: room temperature

What is claimed is:

1. A heat treatment method for strengthening a glass plate in a peripheral region thereof, comprising the steps of:
   (a) heating the glass plate to a first temperature in the range from 550° to 650° C.;
   (b) placing the heated glass plate on a ring-like holder, which is maintained at a second temperature lower than said first temperature by 100° to 600° C., such that a peripheral region of the glass plate contiguous to the peripheral edge of the glass plate makes contact with an upper surface of the ring-like holder;
   (c) keeping the ring-like holder together with the glass plate placed thereon in an annealing furnace maintained at a third temperature which is in the range from 50° to 500° C. and is not higher than said second temperature until the temperature of the glass plate lowers nearly to said third temperature; and
   (d) after step (c) allowing the glass plate to cool down to room temperature.

2. A method according to claim 1, wherein said second and third temperatures are determined so as to create plane compressive stresses ranging from 50 to 500 kg/cm$^2$ in a surface of said peripheral region of the glass plate.

3. A method according to claim 1, wherein the breadth of said peripheral region of the glass plate is not more than 20 mm from the peripheral edge of the glass plate.

4. A method according to claim 3, wherein said breadth is in the range from 10 to 15 mm from the peripheral edge of the glass plate.

5. A method according to claim 1, wherein the glass plate is placed on said ring-like holder such that the peripheral edge of the glass plate is inside the outer peripheral edge of the ring-like holder.

6. A method according to claim 1, wherein said first temperature is in the range from 590° to 630° C.

7. A method according to claim 1, wherein said second temperature is lower than said first temperature by 150° to 500° C.

8. A method according to claim 7, wherein said second temperature is lower than said first temperature by 200° to 450° C.

9. A method according to claim 1, wherein said second temperature is higher than room temperature, said ring-like holder being heated to said second temperature prior to step (b) by keeping the ring-like holder in a hot chamber.

10. A method according to claim 9, wherein said hot chamber is said annealing chamber maintained at said third temperature.

11. A method according to claim 1, wherein said second temperature is higher than room temperature, said ring-like holder being heated to said second temperature prior to step (b) by providing at least one electric heater element to said ring-like holder and energizing said at least one electric heater element.

12. A method according to claim 1, wherein the thickness of the glass plate is in the range from 1.5 to 3.0 mm.

13. A method according to claim 1, wherein the glass plate is a flat glass plate.

14. A method according to claim 1, wherein the glass plate is a curved glass plate.

15. A method according to claim 1, wherein said ring-like holder has a covering which is made of an inorganic fibrous material and arranged such that said covering provides said upper surface of the ring-like holder.

* * * * *